Feb. 19, 1935.  W. C. KENNEDY  1,991,751

SEAT CUSHION

Filed April 8, 1933

INVENTOR
William C. Kennedy
BY
ATTORNEY

Patented Feb. 19, 1935

1,991,751

UNITED STATES PATENT OFFICE 1,991,751

SEAT CUSHION

William C. Kennedy, Phoenix, Ariz., assignor to N. Porter Saddle & Harness Company, Phoenix, Ariz., a corporation of Arizona Application April 8, 1933, Serial No. 665,093

13 Claims. (Cl. 208—15)

This invention relates to removable seat cushions, and more particularly to an improved removable cushion that may be quickly and easily applied to a seat having a broad rear portion, a narrow horn portion and relatively thin peripheral edge portions, such as those commonly used on motorcycles, plows, tractors and the like.

The cushion forming the subject matter of the present invention comprises an improved form of resilient cushion that is preferably provided with a sponge rubber resilient portion, preferably enclosed under some tension, between sheets of strong, wear-resistant material, such as leather or canvas that are preferably cemented to the sponge rubber cushioning material, and means provided for securely mounting the cushion on a vehicle seat. The protecting surface sheets are thereby maintained in taut condition.

An object of the present invention is to provide a comfortable, simplified, and improved form of cushion which can be mounted upon a vehicle seat in a simple and secure manner.

Another object is to provide means for drawing and securing the edge of the cushion in close contact about the edges of a seat upon which the cushion is mounted in such a manner that the cushion will not slip in service.

Another object is to provide a cushion adapted to be removably secured to a seat upon which it may be mounted, in such a manner as to have a neat, attractive appearance, and to have substantially the appearance and feel of a permanently built-in seat.

Another object is to provide a cushion of substantially uniform degree of resilience thruout its seat area, embodying resilient material retained under some tension between leather or fabric covers, the resilience being retained in a substantially uniform degree thruout the life of the cushion, even under hard and continuous usage.

Another object is to provide a seat cushion, the parts of which are secured together so that they are not subject to objectionable shifting or separation in service.

A further object is to provide a cushion having a substantially non-absorbent surface whereby dust, dirt and rain water will not be appreciably absorbed or retained and which may be cleaned or dried quickly without substantial injury to the material from which the cushion is made.

Another object is to provide a removable cushion which is soft and comfortable and which is formed of sturdy, tough and wear-resistant materials, whereby the cushion may be used for a long period of service without special care or attention.

Another object is to provide a cushion which may be inexpensively manufactured.

In the accompanying drawing, which illustrates a suitable embodiment of the invention, Fig. 1 is a top plan view of a removable seat cushion;

Figure 1:
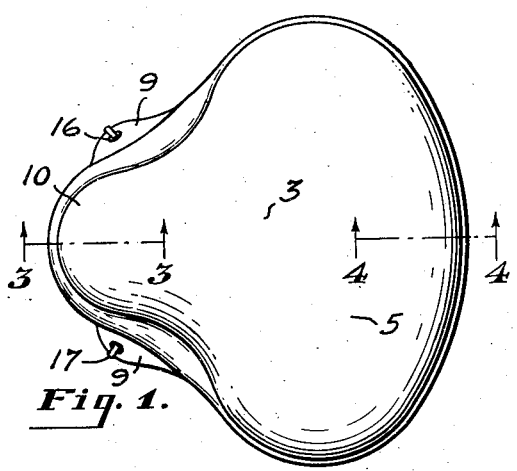
Figure 2:
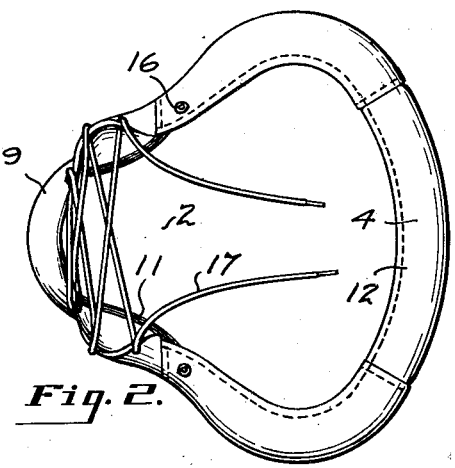
Fig. 2 is a bottom plan view of the cushion shown in Fig. 1 showing a preferred means for securing the seat cushion to a seat.

The seat cushion shown in the accompanying drawing comprises a resilient base portion 1, which is formed of a suitable material such as sponge rubber, Kapok fiber, horsehair, or the like, positioned between a backing portion 2, formed of a flexible material such as canvas, which serves to contact a seat upon which the cushion is to be mounted, and a wear surface portion 3, which consists preferably of a flexible form of wear resistant material such as glove leather, leather substitute, or the like. The backing portion 2 and the wear surface portion 3 are preferably cemented to the base portion 1.

A flange portion 4, is preferably positioned continuously along and extends inwardly of the peripheral edge of a broad rear portion 5 of the substantially wedge-shaped cushion to form a seat rim receiving pocket. Suitable means, such as stitching joins the flange 4 with the edges of the backing portion 2 and the wear surface portion 3 along the rear and sides of the broad rear portion 5 of the cushion.

A horn underlying flange 9 is joined at its ends to the ends of the flange 4 by stitching and extends continuously along the peripheral edge of the narrow horn portion 10 of the substantially wedge-shaped cushion.

The grip of the stitching on the edge of the backing material 2, may be strengthened and fortified against tearing loose by a narrow stitch strengthening strip 11 of leather or other suitable material, positioned outwardly of the backing portion 2, and along its edge.

The peripherally underlying flange 4, is preferably formed of material of single thickness and its unattached edge is turned back and stitched down to form a rolled edge 12. The rolled edge 12 imparts a more finished appearance to and strengthens the flange 4.

The flange portion 9 underlying the horn portion of the seat is preferably of double thickness to better withstand stresses to which this portion of the seat cushion is subjected. Both raw edges of the material forming the flange 9 are positioned against the edge of the surfacing material 3 and are held in place by suitable stitching. The creased edge of the horn underlying flange 9 provides a neat edge thereto.

Figures 3, 4:
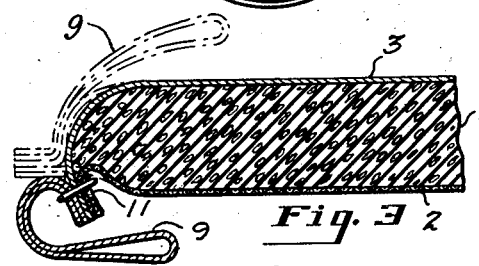
Fig. 3 is an enlarged sectional view taken along the line 3—3 of Fig. 1.
Fig. 4 is an enlarged sectional view taken along the line 4—4 of Fig. 1.

The flanges 4 and 9 of the cushion are stitched or otherwise secured to the peripheral edges of the backing portion 2 and the wear surface portion 3 in the position shown in dotted outline in Fig. 3, as applied to flange portion 9. Upon completion of the stitching, the flange portion is reversed from the position shown in dotted outline to that shown in full lines.

A preferred form of securing means may be provided by a plurality of lace receiving eyelets 16, such as those used in boot and shoe construction, which may be positioned in spaced relation with each other, along opposite sides of the horn underlying flange 9, and a lace 17 threaded thru the eyelets 16, to provide a suitable drawing and securing means for the mounting of the cushion upon a seat. By tightening the lace 17 in the eyelets 16, the opposite sides of the flange 9 may be drawn toward each other and forwardly of the seat. The flange 4, is thus pulled toward the front or horn portion 10 of the cushion and the cushion is caused to seat closely about the periphery of a seat upon which it is mounted. The continuous pocket formed between the flange 4, and the backing material 2, accommodates the thin periphery of the seat upon which the cushion is mounted, giving it the general appearance and secure feel of a permanently built in seat cushion.

Any suitable water-proofing adhesive material, such as rubber cement or water-proof glue, is preferably used to secure the material forming the backing portion 2 and the material forming the surfacing portion 3 upon opposite sides of the material forming the resilient base 1. This form of adhesive material may also be used to secure the edges of the materials forming the surface portion of the cushion and the materials forming the several flanges and strengthening strip 11 together, prior to the stitching operation. By means of this adhesive the creeping or separation of these parts subsequent to the construction of the cushion is substantially prevented and a substantially water-proof quality is imparted to the surfaces of both sides of the cushion. The formation and retention of dust and water accumulations at any point upon the surface of the cushion or elsewhere about the cushion is also substantially completely prevented by the use of this water-proofing adhesive material. This method of joining the parts forming the cushion also precludes the formation of waterpockets and water occlusions between the parts of the cushion, as were commonly present in cushions previously manufactured, which lead to dissatisfaction with a cushion and objectionable discomfort to the user.

It will be particularly observed in both the accompanying drawings and in the described construction of the present cushion that the cushioning material is placed and retained in a condition of tension, particularly along its periphery, thereby maintaining both the surfacing material 3 and the backing material 2 in taut condition. This materially assists in retaining the materials forming the cushion in their proper relative positions irrespective of wear.

Altho the horn underlying flange 9 of the seat cushion, in the preferred form of cushion, is shown as being endless between the eyelet groups, it may be separated transversely, if desired, without change in the operation performed by this construction in drawing the cushion forwardly of the seat upon which the cushion may be mounted and thereby secure the cushion firmly upon the seat.

Figure 5:
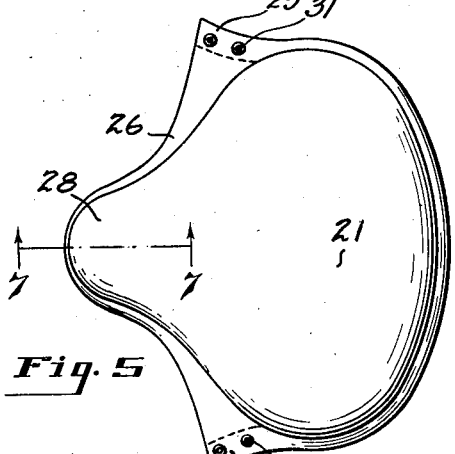
Fig. 5 is a top plan view of a modified form of seat cushion.
Figure 6:
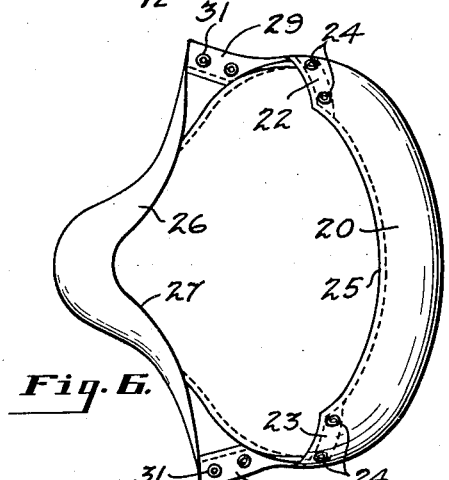
Fig. 6 is a bottom plan view of the modified form of cushion shown in Fig. 5.
Figure 7:
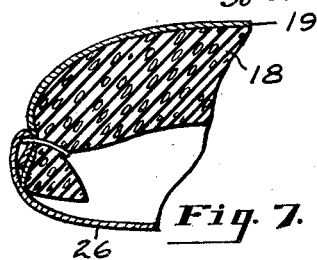
Fig. 7 is an enlarged sectional view taken along line 7—7 of Fig. 5.
Figure 8:
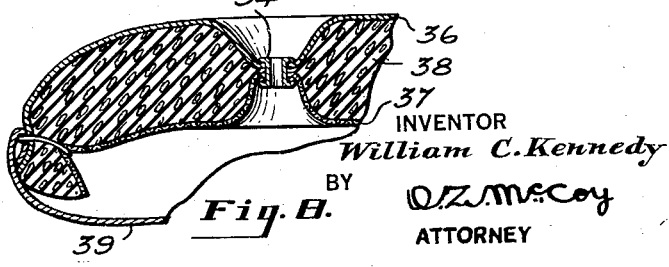
Fig. 8 is an enlarged sectional view of a further modification showing a cushion having a quilted form of seat portion.

A modified form of seat cushion is shown in Figs. 5, 6 and 7, wherein a resilient base portion 18 is preferably adhesively secured to material forming a suitable wear resistant surfacing portion 19 and in which no backing material is used.

In this modified form of cushion a rear flange portion 20 is adapted to underlie the rear edge of a broad rear portion 21 of the cushion. The rear flange portion 20 preferably has overlapped or otherwise reinforced ends 22 and 23 in which suitable securing means, such as eyelets 24, are positioned and also preferably has a rolled longitudinal edge portion 25 as in previously described flange constructions.

A forwardly disposed flange portion 26, preferably having a finishing and strengthening rolled longitudinal edge portion 27 along its unattached edge, similarly underlies a narrow horn portion 28 of the modified form of cushion. The flange portion 26 terminates in end portions 29 and 30 which preferably also are overlapped or reinforced in any suitable manner and are equipped with eyelets 31, belt and buckle, slide fastener elements, or other form of suitable securing means. Suitable laces, not shown, may be provided for threading thru the eyelets 31 and for drawing the ends of the two flange members toward each other whereby the flanges 20 and 26 are placed in tension substantially throughout their length and the cushion may be mounted securely and firmly upon a seat of the character previously described. In this modified form of cushion, as in the preferred form of cushion previously described, advantage is taken of the angularities of the particular type of seat for which the cushion is designed, to cause the tight seating of the rim of the seat upon which a cushion is to be mounted, within the pockets formed between the resilient base portion 18 and the flange portions 20 and 26.

A sectional view of another modified form of seat cushion which is preferred by some users is shown in Fig. 7. In this form of cushion a quilted seat construction is provided by the insertion of a plurality of spaced, open grommets 34 over the seat portion of the cushion. This modified form of seat cushion comprises a wear surface portion 36 and a backing portion 37 disposed, as in the preferred form of seat cushion, upon opposite sides of a resilient base portion 38. A suitable flange portion 39 is positioned to underlie the periphery of the cushion, as in other forms of cushion previously described. The open grommets 34 permit water to drain from the surface of the seat so that water pockets are not formed by the quilting, and the grommets 34 provide air channels that permit the free circulation of air therethru during the successive compression and expansion of the resilient base portion 38 of the cushion during use.

The forms of cushion disclosed herein have wide adaptation in providing a comfortable, soft, removable seat for motorcycles, saddles, agricultural machinery such as hay rakes, riding plows, cutting machines, binders, tractors and the like, and in general to machines having seats with narrow peripheral rims, broad rear portions, and narrow horn portions. The cushion also may be applied to increase the comfort and ease of the driver or operator of other forms of riding or stationary forms of machines provided with seats of the above described type.

What I claim is:

1. A removable seat cushion comprising a padded seat portion, a flange underlying the rim of said padded seat portion substantially throughout its length and secured to said padded seat portion, said flange being shaped to form a continuous pocket about the rim of the rear of the seat portion to which it is to be applied, and means for drawing said flange tightly beneath said seat portion and for pressing the rim of the rear of said seat portion into said seat rim receiving pocket.

2. A removable seat cushion comprising, a cushion body having a wide rear portion, a narrow horn covering portion, an inwardly directed flange portion of flexible material secured to the peripheral edge of said cushion body and underlying the same continuously across the wide rear portion of said cushion body to form a seat rim receiving pocket, and means for drawing the inwardly directed flange toward the horn portion and forwardly of the seat and pressing the rear portion of the seat rim into said pocket.

3. A removable substantially wedge-shaped seat cushion comprising, a cushion body having a wide rear portion, a narrow horn covering portion, an inwardly directed flange of flexible material secured to the peripheral edge of said cushion body and underlying the same continuously across the wide rear portion of said cushion body to form a seat rim receiving pocket, lacing eyelets formed in the opposed portion of the flange carried by the narrow horn covering portion, and lacings connecting said opposed eyelet portions to apply tension to said flange and thereby press the rear portion of the seat rim into said seat rim receiving pocket and secure the cushion in place.

4. A removable substantially wedge-shaped seat cushion comprising a cushion body having a wide rear portion, a narrow horn portion, an inwardly directed flange of flexible material secured to the peripheral edge of said cushion body and underlying the same continuously across the wide rear portion from side to side to form a seat rim receiving pocket, lacing eyelets formed in the opposed portions of the flange carried by the narrow horn covering portion, and connecting means for drawing the flanges from the horn portion of the seat cushion toward each other to thereby pull the cushion forwardly on the seat and press the seat rim into said seat rim receiving pocket and secure the seat cushion in place.

5. A seat cushion, comprising a wear surface material having a broad rear portion and a narrow front horn portion, a rear portion underlying flange providing a seat rim receiving pocket, a front horn portion underlying flange secured at its ends to the ends of said rear portion underlying flange, and means engaging said front horn portion underlying flange for drawing said rear portion underlying flange toward said horn portion and forwardly of the seat and pressing the rear portion of the seat rim into said seat rim receiving pocket.

6. A seat cushion, comprising a wear surface material having a broad rear portion and a narrow front horn portion, a broad rear portion underlying flange secured along one of its edges to said wear surface material to provide a seat rim receiving pocket, a horn portion underlying flange secured along one of its edges to said wear surface material to provide a seat horn receiving pocket, and means engaging said horn portion underlying flange for drawing said broad rear portion underlying flange forwardly of the seat and for pressing the rear portion of the seat rim into said seat rim receiving pocket.

7. A seat cushion, comprising a wear surface material having a broad rear portion and a narrow front horn portion, a broad rear portion underlying flange providing a seat rim receiving pocket, a front horn portion underlying flange providing a seat front horn receiving pocket, and means for drawing said broad rear portion underlying flange toward said front horn portion underlying flange and pressing the rear portion of the seat rim into said seat rim receiving pocket and the front horn portion of the seat into said seat front horn receiving pocket.

8. A seat cushion, comprising a wear surface material having a broad rear portion and a narrow front horn portion, a broad rear portion underlying flange stitched to said wear surface material along the edge of said broad rear portion to form a seat rear rim receiving pocket, a narrow front horn portion underlying flange stitched to said wear surface material along the edge of said front horn portion to form a seat horn receiving pocket, a narrow stitch strengthening strip disposed along said stitched portions for reinforcing the stitching thereof, and means for pressing the rear rim of the seat into said seat rear rim receiving pocket.

9. A seat cushion, comprising a wear surface material having a broad rear portion and a narrow horn portion, a broad rear portion underlying flange having an edge secured to said wear surface material to form a seat rim receiving pocket and terminating laterally of said broad rear portion of said wear surface material in end portions, a horn portion underlying flange having an edge secured to said wear surface material to form a seat horn receiving pocket and terminating laterally of said broad rear portion of said wear surface material in end portions, and means engaging the opposed end portions of both said broad rear portion underlying flange and said horn underlying flange for drawing said flange portions together.

10. A seat cushion, comprising a wear surface material having a broad rear portion and a narrow horn portion, a broad rear portion underlying flange terminating laterally of said broad rear portion in end portions to form a seat rim receiving pocket, a horn portion underlying flange terminating laterally of said broad rear portion in end portions to form a seat horn receiving pocket, a plurality of lace receiving eyelets positioned in each of said end portions of said broad rear underlying flange and said horn underlying flange, and lace means engaging said eyelets and pressing the rear rim of the seat tightly into said seat rim receiving pocket and the horn of the seat tightly into said seat horn receiving pocket.

11. A seat cushion having a broad rear portion and a narrow horn portion, comprising a flexible wear surface material, a resilient base material cemented to said wear surface material and supplying resilience to said seat cushion, a broad rear portion underlying flange positioned continuously along and extending inwardly of the edge of said broad rear portion of said seat cushion to provide a seat rim receiving pocket, a horn underlying flange positioned continuously along and extending inwardly of the edge of said narrow horn portion of said seat cushion to form a seat horn receiving pocket and joined at its ends to the ends of said broad rear portion underlying flange of said cushion, a flexible backing material cemented to said resilient base material and stitched along the periphery of said cushion to said wear surface material and to said broad rear portion underlying flange and to said horn underlying flange and confining closely said resilient base material, and means applied to said horn underlying flange for pressing the rear rim of the seat into said seat rim receiving pocket and for securing said cushion on the seat.

12. A seat cushion having a broad rear portion and a narrow horn portion, comprising a wear surface material overlying both said broad rear portion and said narrow horn portion of said cushion, a broad rear portion underlying flange having an attached edge and an unattached edge and secured along its attached edge to the peripheral edge of said wear surface material and underlying said broad rear portion of said cushion to form a seat rim receiving pocket, a rolled edge extending longitudinally of the unattached edge of said broad rear portion underlying flange for strengthening and imparting a finished appearance to said unattached edge of said broad rear underlying flange, a horn portion underlying flange of double thickness material and having an attached edge and an unattached edge and secured along its attached edge to the peripheral edge of said wear surface material and underlying said narrow horn portion of said cushion to form a seat horn receiving pocket, and a drawing and securing means applied to said double thickness portion of said horn underlying flange for drawing said broad rear portion underlying flange toward said horn underlying flange and for securing said broad rear portion underlying flange in said drawn position.

13. A removable seat cushion comprising a padded seat portion, a flange underlying the rim of said padded seat portion substantially throughout its length and secured to said padded seat portion, said flange being shaped to form a continuous pocket about the rear of the rim of the seat portion to which it is to be applied, and means for drawing said flange tightly beneath said seat portion and for pressing the rim of the rear of said seat portion into said seat rim receiving pocket.

WILLIAM C. KENNEDY.